(12) United States Patent  
Arkin

(10) Patent No.: US 8,459,481 B2  
(45) Date of Patent: Jun. 11, 2013

(54) WINDOW INSERT

(75) Inventor: Jonathan G. Arkin, Lee's Summit, MO (US)

(73) Assignee: Never Norm LLC, Lee's Summit, MO (US)

( * ) Notice: Subject to any disclaimer, the term of this patent is extended or adjusted under 35 U.S.C. 154(b) by 398 days.

(21) Appl. No.: 12/257,092

(22) Filed: Oct. 23, 2008

(65) Prior Publication Data  
US 2010/0102183 A1 Apr. 29, 2010

(51) Int. Cl.  
B65D 6/00 (2006.01)

(52) U.S. Cl.  
USPC .................................................. 220/6; 220/7

(58) Field of Classification Search  
USPC ................... 229/400, 4.5; 224/482, 926, 556, 224/560, 564; 108/44, 46, 25, 152; D7/619.1, D7/620; 220/7, 6, 666, 737, 738; 206/427, 206/434, 139, 217, 486  
See application file for complete search history.

(56) References Cited

U.S. PATENT DOCUMENTS

| 1,915,958 | A | * | 6/1933 | Skirrow | 248/300 |
| 2,457,918 | A | | 1/1949 | Pierce | |
| 2,938,297 | A | | 5/1960 | Greene | |
| 3,692,228 | A | * | 9/1972 | Spiegel | 206/486 |
| 3,712,235 | A | * | 1/1973 | Russ | 108/46 |
| D287,789 | S | * | 1/1987 | Johnson | D7/620 |
| 4,893,773 | A | * | 1/1990 | Fujimoto | 248/311.2 |
| 5,028,026 | A | | 7/1991 | Phillips et al. | |
| 5,667,119 | A | | 9/1997 | Florence | |
| 5,715,876 | A | | 2/1998 | Burt | |
| 2006/0096983 | A1 | * | 5/2006 | Patterson | 220/253 |

FOREIGN PATENT DOCUMENTS

WO    WO 01/76411    10/2001

* cited by examiner

Primary Examiner — Alfred J Wujciak  
(74) Attorney, Agent, or Firm — Grasso PLLC; Fred Grasso

(57) ABSTRACT

The application is directed to a window insert that may be inserted into a gap near a window such that the insert may be visible through the window. In certain embodiments, the application is directed to a window insert having a visible area that may be visible through the window and may also have a ledge area that may support, hold, or otherwise retain a removable product or removable accessory on, near, or around the window insert. The window insert may further comprise an anchor and a visible area wherein the ledge contains one or more wells for holding or retaining food stuffs.

33 Claims, 10 Drawing Sheets

FIG. 9

A method of manufacturing a window insert

900 — Sizing and cutting a paper or polymer cardstock to a preselected size and shape.

910 — Printing images, text or both on one or more sides of the card stock.

920 — Folding, cutting and/or partitioning the card stock to form a partially or fully assembled window insert. The window insert having a ledge, an anchor, a visible area, and one or more wells in the ledge.

930 — Instructions for unfolding or assembling the window insert may also be printed on the window insert or packaged with the window insert on the same or separate card stock or other material.

940 — Gathering the partially or fully assembled window insert into groups for transport or other movement.

WINDOW INSERT

FIELD OF THE INVENTION

The application is directed to a window insert that may be inserted into a gap near a window such that the insert may be visible through the window. More specifically, the application is directed to a window insert having a visible area that may be visible through the window and may also have a ledge area that may support, hold, or otherwise retain a removable product or removable accessory on, near, or around the window insert.

BACKGROUND

Today's busy and ambulant society spends significant amounts of time in vehicles moving between destinations or performing work on the job. This time can be in substantial blocks and can extend though periods of the day when meals are consumed. The convenience and other advantages associated with consuming meals in a vehicle have led to the development and growth of drive-in window restaurants and other eat-on-the-go food offerings. Indeed, societies' busy schedule has supported the near ubiquitous development and proliferation of drive-in window restaurants and other eat-on-the-go food offerings.

SUMMARY OF THE INVENTION

The invention includes embodiments where a window insert is placed in or around a gap or space near a window such that the insert can stay positioned near the window and can also retain, hold or support a condiment or food item being consumed by an individual. The person consuming the meal may include an operator or passenger of the vehicle as well as someone near the vehicle, but perhaps outside of it. The window in which the window insert is positioned near, may be in locations other than a vehicle as well. Also, the window may contain glass or other transparent or translucent materials and may be an opening with or without glass or other materials as well as openings with only some glass or other material.

In embodiments, the window insert can have an anchor area, a ledge area, and a visible area. The ledge area may contain wells or other features that can hold or retain food stuffs including condiments and other items being consumed during a meal. The ledge area or other portions of the window insert may be stored in a collapsed or folded configuration such that assembly of the window insert may be required prior to a user using the window insert. In some embodiments, the unfolding may require assembly or fitting of parts while in other embodiments it may require expansion of parts or combinations of expansion of parts and assembly or fitting of parts.

The visible area of the window insert may contain advertising or messages that are visible from outside the vehicle when the window insert is placed in the gap near the window. Thus, when a window insert is being used by a user, individuals outside of the vehicle or on the other side of the window may be informed by the visible printing or pictures on the visible area of the window insert, of a particular message, picture, or other information. In some embodiments these pictures and messages may contain advertising and other material; they can even designate the restaurant from which the meal was purchased or specials of the day. There may be printing, pictures, instructions of use, and other information on all or some surfaces of the window insert as well.

The window insert may be folded or stored such that it can be unfolded, expanded, or otherwise assembled prior to its use. By folding or storing the window insert in this fashion, the space occupied by stored window inserts and the transportation costs of the window inserts can be reduced.

BRIEF DESCRIPTION OF THE DRAWINGS

FIG. 9 shows steps that may be taken while performing a method in accord with one or more embodiments of the invention.

DETAILED DESCRIPTION

Figure 1A:
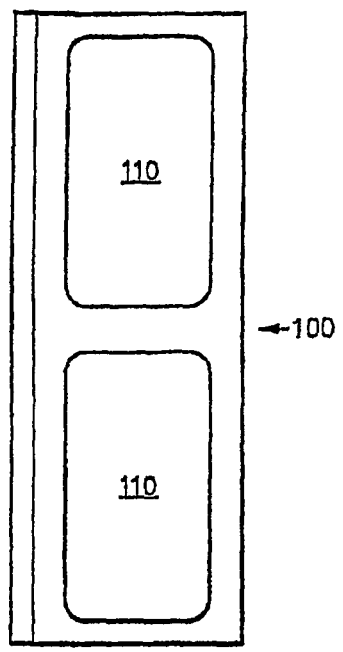
FIGS. 1a-1c show top, side, and front views of a window insert in accord with one or more embodiments of the invention.

When a meal is consumed in a motor vehicle, such as in an automobile, tractor-trailer, or work vehicle, the operator or passenger may choose to consume the meal while the vehicle is running, perhaps even when the vehicle is moving and being operated. When different types of food are consumed during a meal eaten in a vehicle, for instance a "French-dip" sandwich and drink, the operator or passenger can be confronted with a lack of space to hold or retain some of the food or drinks being consumed during the meal. Cups may be placed in cup-holders, but little, if anything else, exists within the vehicle to support or retain the food being eaten, including the condiments that may be consumed to compliment the meal. For example, with respect to the "French-dip" sandwich, the aus-ju broth may be placed on an adjacent seat or the dash board, neither of which is within easy reach of an occupant of the vehicle. Indeed, the aus ju broth may be prone to spilling and sliding if the vehicle is moving when placed in either of these locations.

Embodiments of the invention include inserts for holding or supporting portions of a meal, where the inserts may be placed next to a window of a motor vehicle or other opening. These inserts may be slid into a gap near the window and may be further supported by a flange or shelf near the window. When in use, the window insert may support or hold condiments, or other portions of a meal being consumed by a user. The gap into which the window insert may be slid may be the gap associated with windows that retract into a door or side panel of a vehicle as well as a gap associated with a window that swings away from its frame, much like a casement window. The gap may be on other types of windows or openings as well.

A portion or all of the insert sliding down into the gap next to the window, may anchor or provide stabilization to the insert. The insert may also include a ledge that may rest on a shelf, flange, or other surface near the window. This shelf, flange, or other surface may provide stabilization to the insert. The cooperation between the anchor of the insert, the ledge of the insert, and the shelf or other surface near the window, can provide an adequately stable area in which condiments, or parts of a meal being consumed by a user, may be placed. Thus, in a vehicle, the window insert takes advantage of the presence of an arm rest shelf area and the gap near a retractable window, in order to provide support or otherwise hold condiments or other portions of a meal being consumed by a user.

Being positioned near the window, the window insert may be visible from outside of the vehicle. As noted above, this visible area may be used for advertising or for other purposes as well. The visible area may contain previously printed images or words to be viewed by someone outside of the vehicle or on the other side of the window when the insert is positioned at the window. The advertising can contain the name of the restaurant that is the source of the meal as well as specials or other information about the restaurant. It may contain images and text that are unrelated to the restaurant or is only tangentially related to the restaurant that provided the insert. For example, a local radio station may be advertised on the visible area and/or a local promotion being sponsored by the restaurant may each or both be advertised. Various combinations of text and figures may be provided in the visible area and/or on other portions of the window insert.

As noted above, a user of the window insert may be asked, prompted, or required to expand, unfold, partially assemble, or fully assemble the window insert. The window insert may be comprised of a heavy paper card stock or other flexible material and may be assembled by unfolding portions of the insert away from other portions of the insert. Wells present in the ledge may need to be punched out by the user or otherwise assembled as well. These wells may provide an area for holding or retaining condiments or other food items. In some embodiments the wells may be specifically designed and sized to accommodate a specific condiment container, such as a dipping sauce container. In an expanded position and during assembly, the ledge may need to be glued or otherwise secured back to the insert by the user. The ledge may be assembled such that the user need not do more than simply expand it, place the window insert into a gap near a window, and begin to use the window insert.

In use, customers may specifically request that they are provided a window insert when purchasing their meals. Restaurants may provide one for certain meals or for all meals. The design and preferable ease of manufacture of embodiments of the invention may enable restaurants to provide a window insert at no cost to the user. A restaurant may decide to charge for the window inserts as well. Other entities may also provide the window inserts to users.

Various bendable or flexible stock materials may be used to manufacture the window inserts. These would include thin fiber boards or card boards and relatively stiff paper boards. Other pulp based products may also be suitable as bendable or flexible stock materials. Flexible polymer sheets may also be used as stock materials. It is advantageous to use low cost materials that can be readily folded and punched to form the shape of the window insert and the one or more wells that the window insert may contain. Also, it is advantageous to select stock materials that may be readily printed on or embossed such that the information printed on the window insert may be readily seen and viewed by others who are able to see the visible area of the window insert when the window insert is being used.

Figure 1C:
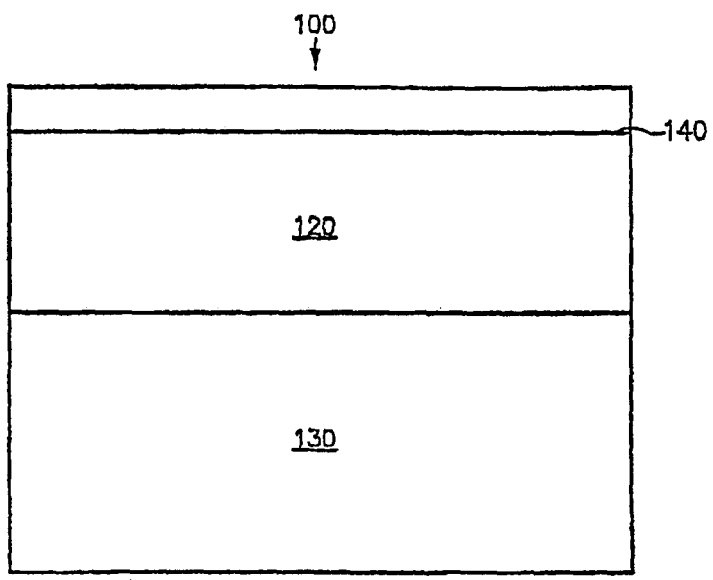
Figure 1B:
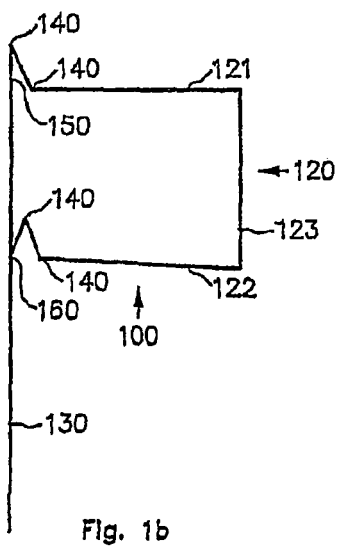

FIGS. 1a-1c show a two-dimensional view of the top, side, and front of a window insert 100 in accord to one embodiment. Visible in FIG. 1 is the body of a window insert 100. The body of the window insert 100 in this embodiment comprised wells 110, creases 140, and a ledge 120 with a top surface 121 of the ledge 120, a front surface 123 of the ledge 120, and a bottom surface 122 of the ledge 120. The window insert 100 in these figures also has a visible area 170, an anchor 130, and a lip 150. Also visible in these figures is the attachment point 160, where the stock material comprising the window insert 100 is secured to itself to form the ledge 120. Various methodologies may be used to secure the stock material onto itself at the attachment point. These include adhesives and the physical configuration of the window insert itself. Examples of how this attachment may be made are provided later in the specification.

The creases 140 and the lip 150 of the window insert 100, as well as the length of the anchor 130, provide structural rigidity along the width of the window insert 100. The wells 110 on the top surface 121 of the ledge 120 provide chambers, spaces or voids in which a condiment or other portion of a meal may be placed in and held by the window insert 100. In this embodiment, the voids are rectangular in shape and spaced equidistant apart and in the top surface. Other orientations and spacings may also be possible to accommodate various food items or condiments. Likewise, the depth of the ledge 120 may be determined to accommodate a specific condiment container or food item such that the food item rests atop the top surface and extends near or completely to the bottom surface 122 of the ledge 120. The top and side views of the window insert show its rectangular design, however, other designs and configurations are also possible. For example, the edges of the anchor may be rounded or cut out in various applications. Also, the top may be triangular or have other configurations. These other shapes may accommodate specific food items, specific placements, and may also contribute to the structural integrity of the window insert. In certain preferred embodiments the window inserts may range in size from two or so inches in width to six of more inches in width. The anchors may fall in this range as well. Other sizes are possible and also fall within the scope of the disclosure and the invention.

Images and text may be printed or embossed onto the visible area 170 as well as onto other surfaces of the window insert 100. This may include placing instructions for assembly or use on one or more surfaces of the window insert 100.

Figure 2A:
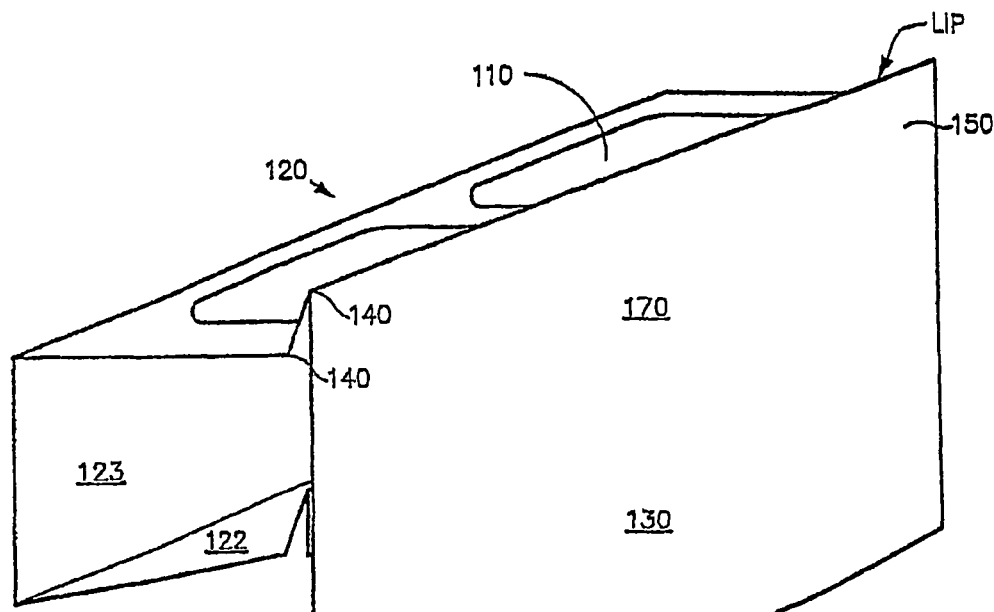
FIGS. 2a-2b show side perspective views of a window insert in accord with one or more embodiments of the invention.
Figure 2B:
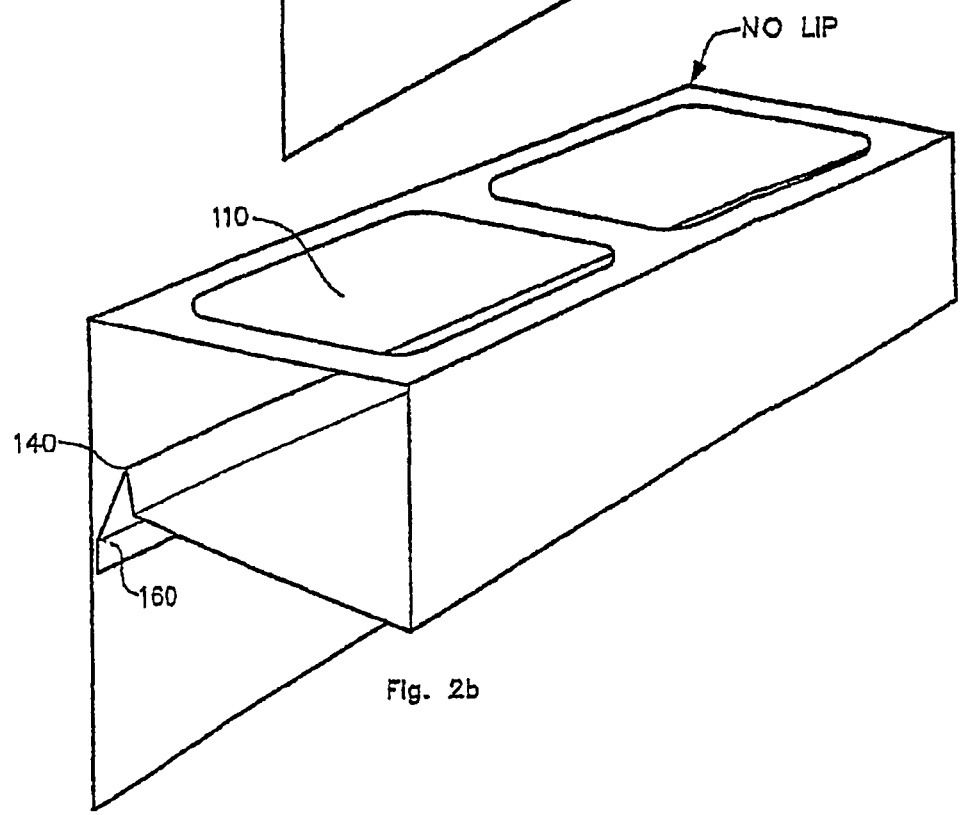

FIGS. 2a-2b show perspective side views of a window insert embodiment As can be seen in this view, the bottom surface 122 of the ledge 120 need not be parallel to the top surface 121 of the ledge 120. As can also be seen in FIG. 2b, the attachment point 160 of the bottom surface 122 to the back of the window support may be below a crease 140. Also, the transition between the top surface 121 and the visible area 170 may not include a lip and multiple creases as in FIG. 1b. Thus, multiple configurations of a window insert in accord with the invention are plausible. The visible area 170 may contain printing and pictures in the entire area as well as in portions of the visible area 170. The visible area 170 and the anchor 130 form a back of the widow insert in this embodiment.

Figure 3A:
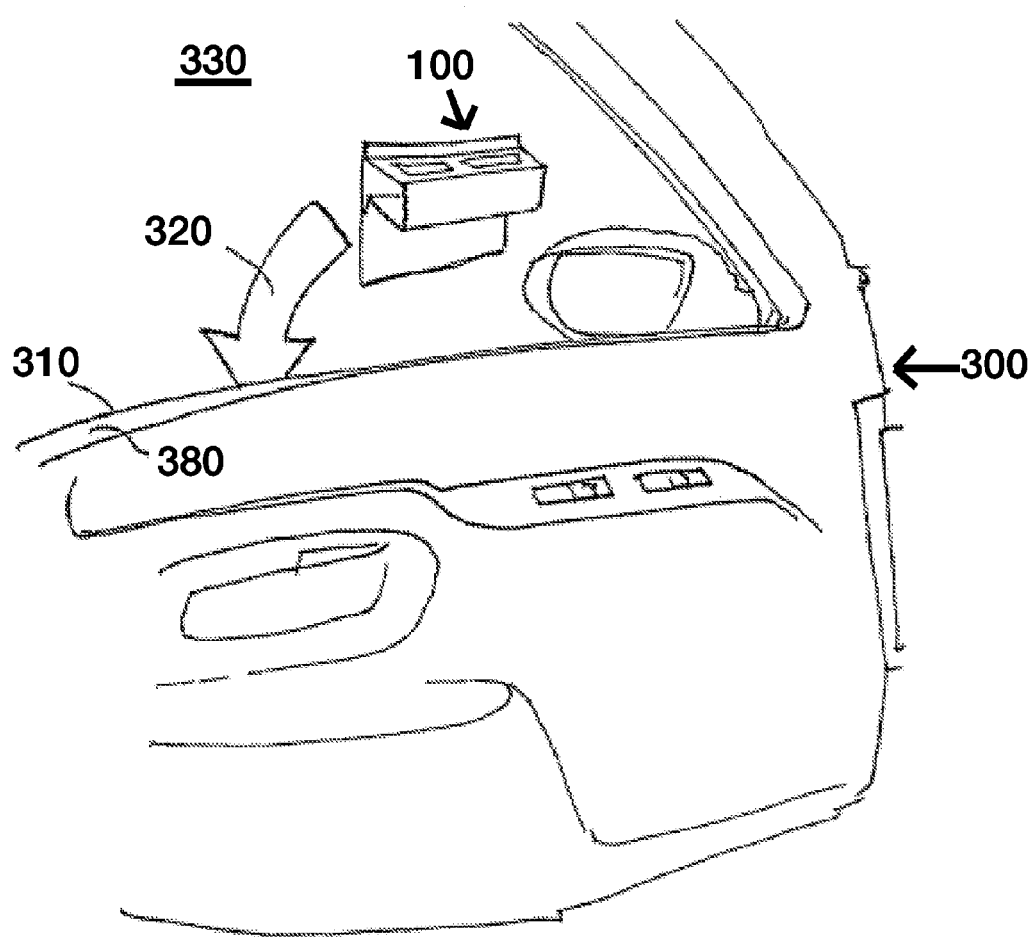
FIGS. 3a-3c show a window insert, in accord with one or more embodiments of the invention, being placed into a gap near a vehicle window.
Figure 3B:
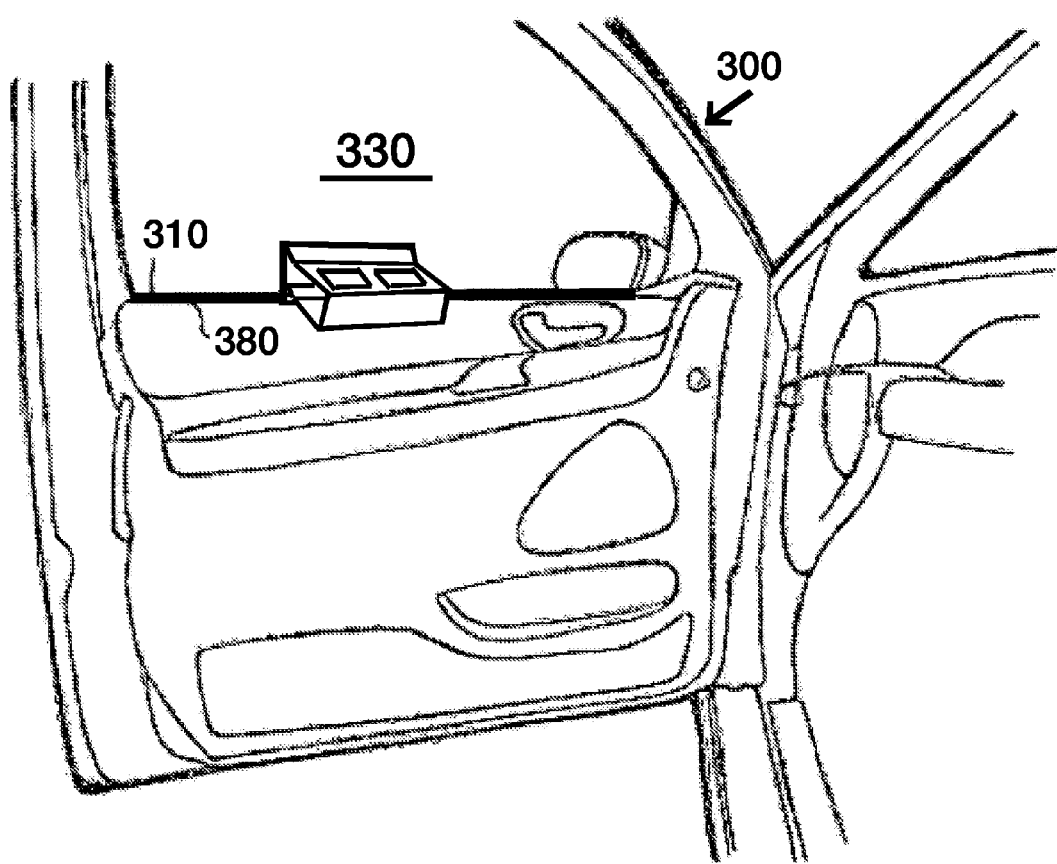
Figure 3C:
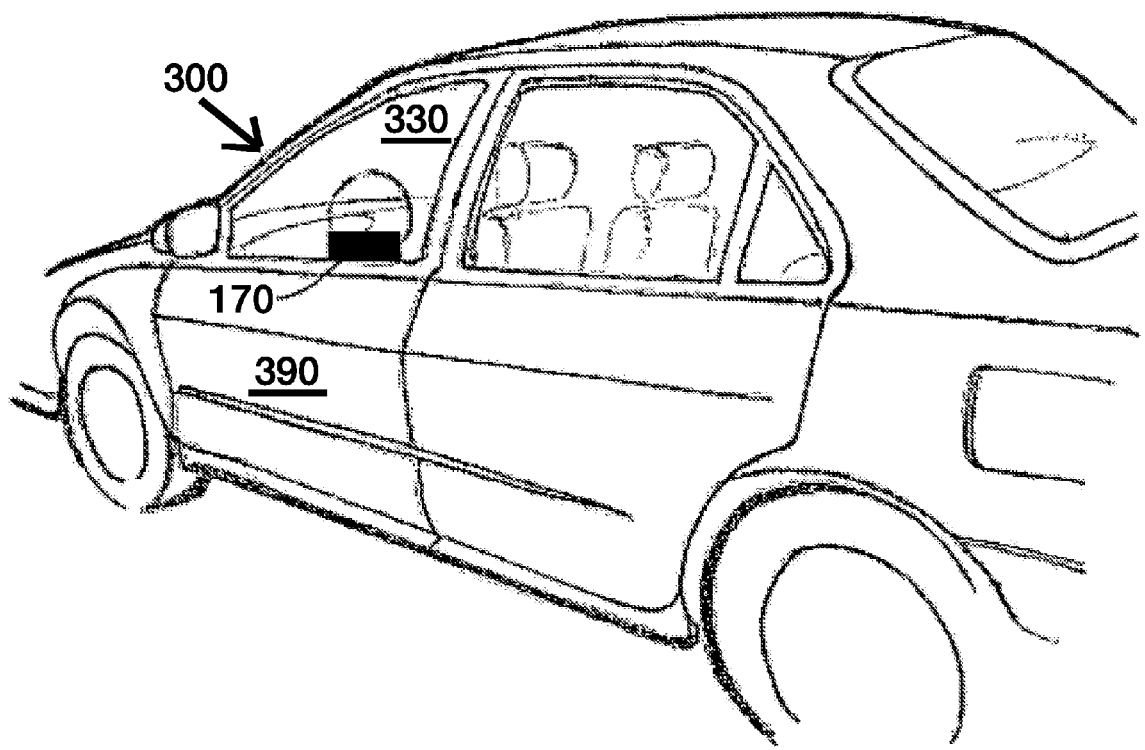

FIGS. 3a-3c show internal and external views of a window insert 100 being placed in a window of a vehicle door 300 in accord with embodiments of the invention. As shown by the arrow 320, the anchor 130 is intended to be inserted into the gap 310 of the vehicle door 300 and the window 330. As shown in FIG. 3c once the window insert is in place, the visible area 170 is visible through the window 330. Also evident, and as shown in FIG. 3b is that the ledge 120 is resting on the shelf 380 of the vehicle door 300. Thus, the combination of the ledge 120 resting on the shelf 380, and the creases of the window insert design, provide adequate rigidity and support for food items that may be retained by the window insert, including condiment containers placed in the wells of the ledge.

The window may be in various open or closed positions when the window insert is placed in the gap 310. The window may even be retracted when the window insert is positioned. Conversely, however, it is not recommended that the window be raised when the window insert is in the gap because the raising forces of the window may lift the window insert up and out of the gap. Nevertheless, raising the window may be considered within the scope of the invention.

Figure 4A:
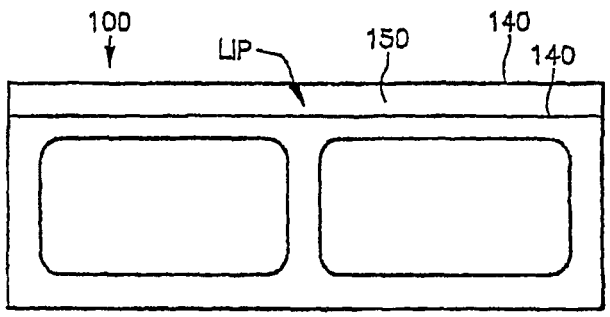
FIGS. 4a-4c show top plan views of a window insert in accord with one or more embodiments of the invention.
Figure 4B:
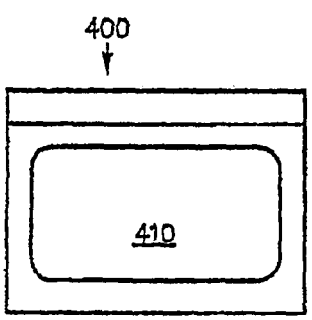
Figure 4C:
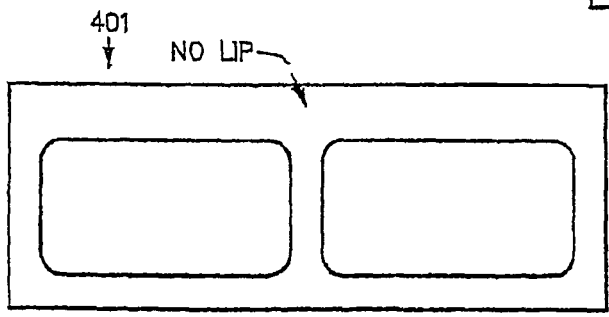

FIGS. 4a-4c show various top views of embodiments of the window insert. FIG. 4a shows that the lip 150 and creases 140 may extend out away from the back of the window insert when the ledge is assembled. FIG. 4b shows a window insert 400 having a single well 410. FIG. 4c shows a window insert 401 having double wells but no lip or creases on the top surface. Support for the top surface may be provided here, or in other embodiments, through creases in other areas of the window insert and through other supports, such as through a center beam made from the card stock the window insert is made from where the center beam extends from the back of the window insert to the front of the ledge and provides additional support opposing collapse of the ledge.

Figure 5A:
FIGS. 5a-5c show top plan views of a window insert in accord with one or more embodiments of the invention.
Figure 5B:
Figure 5C:

FIGS. 5a-5c show various well configurations of an exemplary window insert. Wells 510, 511, and 512 are shown with square, hexagonal, and circular dimensions. Other dimensions are also plausible. In this and other embodiments, while a uniform depth is shown in the ledge and the wells within the ledge, various depths may be considered such that short and tall food items or food items having significantly different shapes, may be retained by the window insert. Thus, the ledge may have different heights or depths and so too may the wells. For example, one well may be 0.5 inches deep while an adjacent well may be 0.35 inches deep. Likewise, the ledge may be 1.0 inches high on one end and 0.5 inches high on another end.

Figure 6:
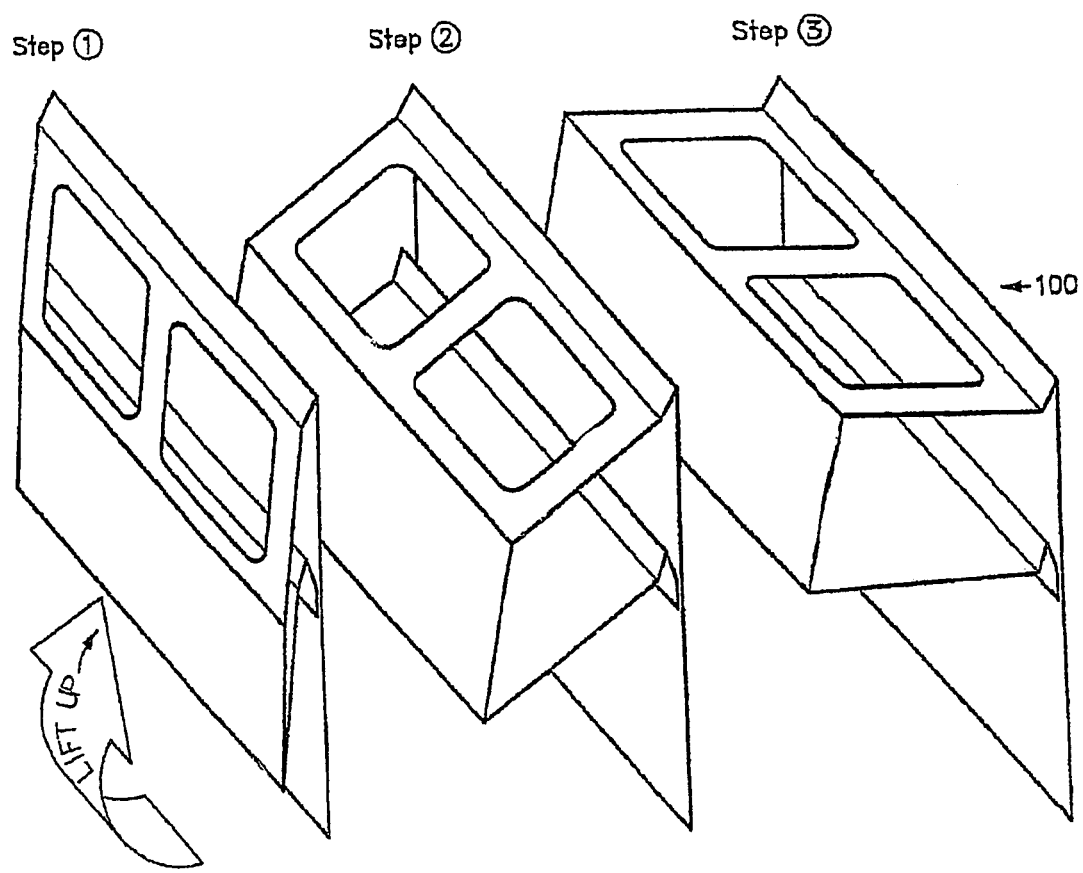
FIG. 6 shows views of a window insert being expanded in accord with one or more embodiments of the invention.

FIG. 6 shows how a window insert may be stored and subsequently expanded in use. Beginning in step one, the window insert may be manufactured such that the ledge is folded down across the anchor of the window insert. As can be seen, in this folded configuration the bottom surface may be sized such that its length is approximately equal to the combined length of the lip, the top surface and the front surface of the ledge. As the ledge is pulled forward and expanded in step two, the creases and lip near the bottom surface may begin to move away from the back along with the ledge itself. In step three, the creases and lips of the top surface and the bottom surface may be crimped such that they provide the rigidity and support to the assembled window insert. Once expanded or during the expansion process, the window insert may be placed in the gap near a window for use. The wells in this embodiment are shown punched out. In some embodiments additional steps may be needed to punch out or otherwise assemble the wells in the top surface of the ledge as well. In this embodiment the attachment point between the back and the bottom surface of the ledge has been affixed prior to assembly by the user. In other embodiments, the user may be required to attach the bottom surface of the ledge to an inside back surface of the window insert.

Figure 7A:
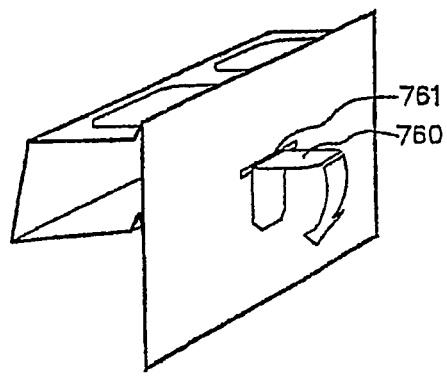
FIGS. 7a-7e shows views of various embodiments of a window insert in accord with one or more embodiments of the invention.
Figure 7C:
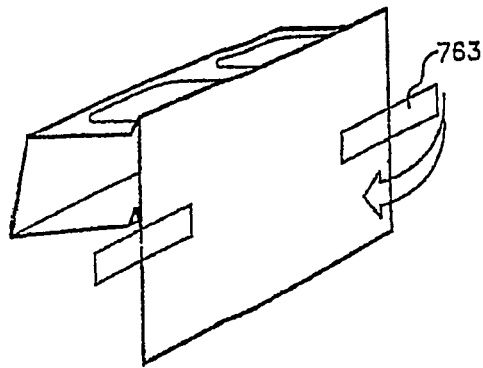
Figure 7B:
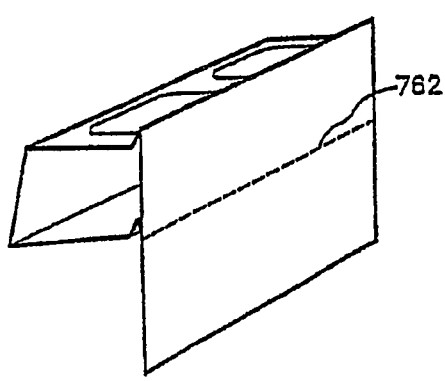
Figure 7D:
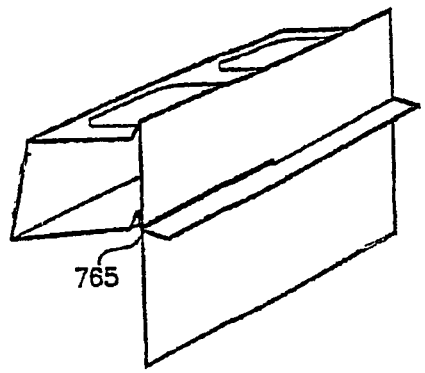
Figure 7E:
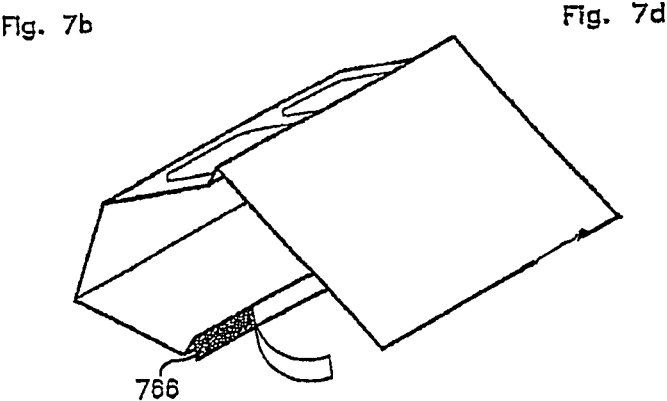

FIGS. 7a-7e show various methods in which the bottom surface of the ledge may be affixed to the back of the window insert. FIG. 7a shows a slit 761 in the back of the window insert in which a tab 760 from the bottom surface of the ledge may be inserted. Once inserted, the tab may be bent to inhibit removal of the tab from the slit 761. FIG. 7b shows a line of glue 762 being used to secure the bottom surface of the ledge to the back of the window insert. This glue may be adhered by the manufacturer, by the user, or a combination of both. For instance, one surface may have glue applied to it by the manufacturer while the mating surface may have glue applied by the user. FIG. 7e shows a variation of this as a peel and stick adhesive is used to secure the bottom surface to the back of the window insert. FIG. 7c shows tabs 763 that may be folded over the back from the bottom surface in order to assemble the ledge of the window insert. FIG. 7d shows how slits 765 and 764 may be cut in the bottom surface and back and then mated with each other to secure the bottom surface to the back of the window insert. Each of the slit, the line of glue, the peel and stick surfaces, and the tabs may be considered means for securing the ledge to the body of the window insert.

Figure 8:
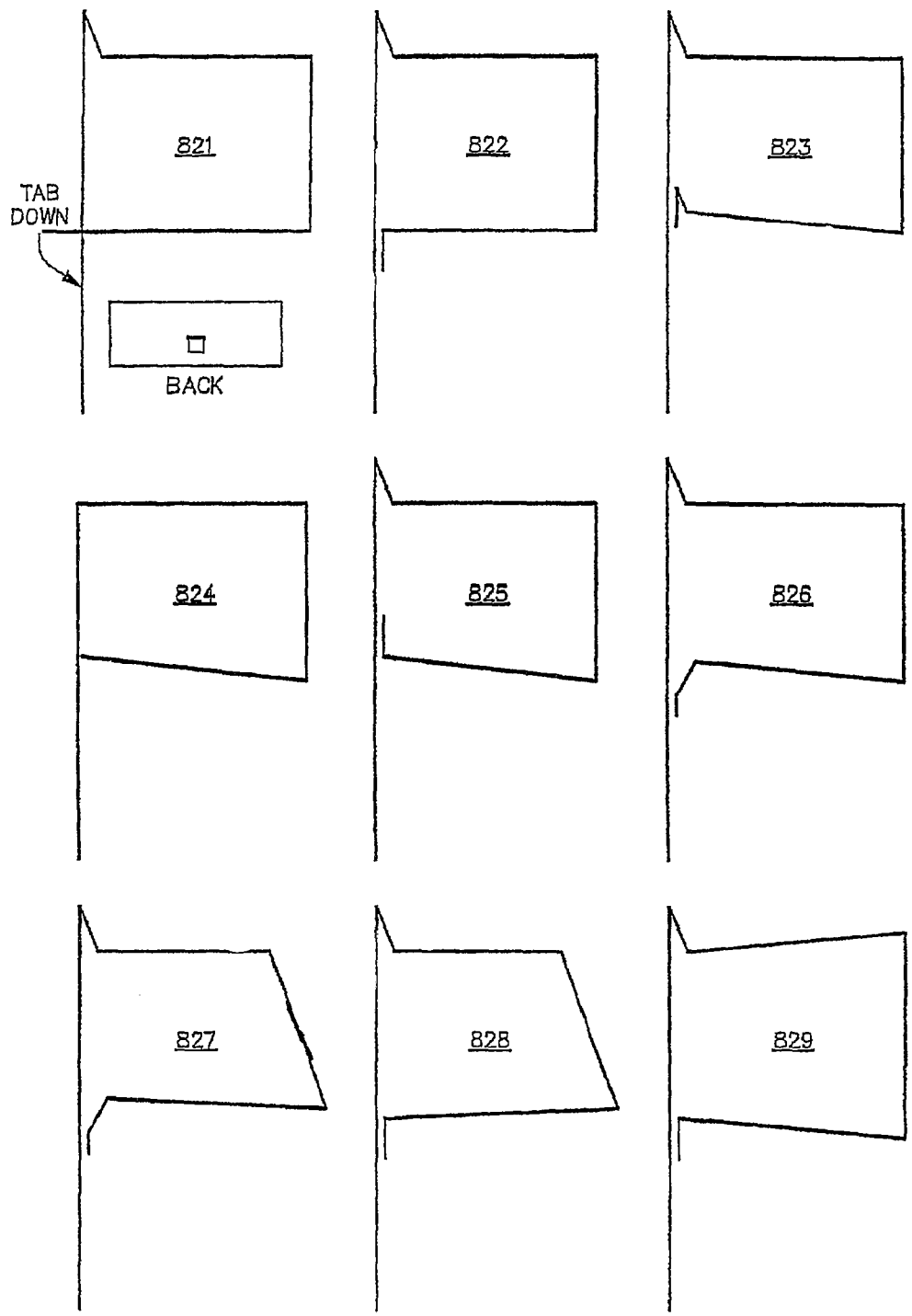
FIG. 8 shows sectional side views of various folding configurations of a window insert in accord with one or more embodiments of the invention.

FIG. 8 shows various side sectional elevations of a window insert in accord with the invention. As can be seen, various lengths of the top surface and bottom surface may be used and some embodiments may or may not have creases and/or top lips in their designs. The window inserts 821-829 each have four sides in these embodiments, however, four sides are not required as three or other another number may be used. When three sides comprise the ledge, a side sectional view of the ledge would generally form a triangular shape.

FIG. 9 shows a method of manufacturing a window insert in accord with the disclosed embodiments of the invention. As shown in the boxes of FIG. 9, the method may include sizing and cutting bendable stock, such as paper or cardboard or plastic or laminated sheeting, to a preselected size and shape. The preselected size and shape may include rectangular, square, trapezoidal shapes occupying one or less square feet. Other dimensions and sizes may also be used. It is preferred that the selected shapes allow for the window insert to be assembled from a single card stock, although assembling the window insert from multiple card stocks may be possible. Images may also be printed on sides of the card stock as indicated in box 910. These images and text may include advertising for the visible area that can be viewed through the window as well as assembly instructions for an end user. The manufacturing process may also include scoring, folding, cutting and otherwise assembling the card stock such that a partially assembled window insert is constructed. Still further, the manufacturing process may include embossing or scoring the stock such that subsequent steps may be drawn or folded along the embossment or score to create features such as the openings or wells of the ledge and the slits for securing the ledge to the window insert body. Vacuum forces as well as mechanical presses may be used during the various steps of the manufacturing process.

Box 930 shows that in addition to instructions being placed on the card stock itself, additional instructions may be packaged with a plurality of window inserts that are gathered for shipment and storage. Box 940 shows that the manufacturing steps may include gathering, packaging, and wrapping the window inserts for shipment to and storage at restaurants or other institutions that distribute or sell the window inserts to its customers. Thus, the finished manufacturing product can include the partially assembled window inserts as well as window inserts that have been packaged together for storage and shipment to restaurants or other end users.

Various configurations of a window insert as well as methods for assembly and manufacture have been provided. In addition to these embodiments and examples others are also possible within the scope of the invention. Moreover, features and aspects from the disclosed embodiments may be readily exchanged with each other as well as removed and added to the various embodiments. These changes can include the manner in which the window insert is designed, the manner in which it is displayed, and the manner in which it is supported. Likewise, the methods described herein may include each of the steps provided as well as additional and fewer steps. The order of the steps may be different as well.

What is claimed is:

1. A device for insertion into a gap near a window, the device comprising:
   a window insert comprising an anchor, a visible area, and a ledge,
   wherein the window insert is formed from a polymer card stock material or a paper card stock material,
   wherein the visible area has one or more areas for receiving printed images or text or both on a visible surface of the window insert,
   wherein the ledge is extendable away from the visible area and the ledge comprises a plurality of surfaces including a bottom surface, the plurality of surface substantially defining a void space within the ledge,
   wherein one or more wells is positioned within or extends into the void space from one or more surfaces of the plurality of surfaces,
   wherein the anchor is substantially planar, extends away from the visible area and the ledge, and the anchor has a bottom end,
   wherein the bottom end of the anchor extends from the ledge,
   wherein the bottom end of the anchor extends below and beyond the bottom surface of the ledge, and,
   wherein the window insert is configured with two or more creases that form an angle when the ledge is in an extended position and wherein the creases serve to connect the visible area to the ledge.

2. The device of claim 1 wherein a section taken along the length of the window insert has a profile forming substantially a "P" shape.

3. The device of claim 1 wherein the ledge is expandable from a first retracted position to a second extended position, the second extended position providing access to one or more wells accessible through a top surface of the ledge.

4. The device of claim 3 wherein the wells are sized and shaped to accept a first vessel, the first vessel packaged and configured to retain and store foodstuffs.

5. The device of claim 4 further comprising a first vessel, the first vessel comprising a polymer shell and a removable sealing surface.

6. The device of claim 1 wherein the ledge connects to the visible area of the window insert through one or more creases.

7. The device of claim 6 wherein the creases are made along a width of the ledge and wherein the ledge and the visible area are made from a continuous card stock material.

8. The device of claim 1 wherein the bottom surface of the ledge is attached to the anchor, or the visible area, or both.

9. The device of claim 1 wherein the ledge further defines one or more wells that extend downward into the void space of the ledge, at least when the ledge is in an extended position.

10. The device of claim 1 wherein the ledge is movable from a first position to a second extended position, the ledge in the first position is positioned atop the anchor, the ledge in the second position occupies a larger volume than when in the first position and also extends away from the anchor when in the second position.

11. The device of claim 1 wherein the ledge, the anchor, and the visible area are formed from a single paper card stock, the paper card stock having an area no greater than two square feet.

12. The device of claim 1 wherein the ledge, the anchor, and the visible area are formed from a single polymer card stock, the polymer card stock having an area no greater than two square feet.

13. The device of claim 1 wherein a means for securing the ledge to the window insert is used to secure a surface of the ledge to a portion of the window insert.

14. The device of claim 1 wherein the creases and the angle are each positioned on a continuous piece of card stock between the ledge of the window insert and the visible area of the window insert.

15. The device of claim 1 wherein the polymer card stock material or the paper card stock material is a continuous piece of card stock material.

16. The device of claim 1 wherein the bottom surface of the ledge is secured directly to a vertical surface of the anchor.

17. A device for insertion into a gap near a window, the device comprising:
   a window insert comprising an anchor, a visible area, and a ledge,
   wherein the window insert is formed from a polymer card stock material or a paper card stock material,
   wherein the visible area has one or more areas for receiving printed images or text or both on a visible surface of the window insert,
   wherein the ledge is extendable away from the visible area and the ledge comprises a plurality of surfaces including a bottom surface, the plurality of surface substantially defining a void space within the ledge,
   wherein one or more wells is positioned within or extends into the void space from one or more surfaces of the plurality of surfaces,
   wherein the anchor is substantially planar, extends away from the visible area and the ledge,
   wherein the ledge connects to the visible area of the window insert through one or more creases and,
   wherein the creases are made along a width of the ledge.

18. A device for insertion into a gap near a window, the device comprising:
   a window insert comprising an anchor, a visible area, and a ledge,
   wherein the window insert is formed from a polymer card stock material or a paper card stock material,
   wherein the visible area has one or more areas for receiving printed images or text or both on a visible surface of the window insert,
   wherein the ledge is extendable away from the visible area and the ledge comprises a plurality of surfaces including a bottom surface, the plurality of surface substantially defining a void space within the ledge,
   wherein one or more wells is positioned within or extends into the void space from one or more surfaces of the plurality of surfaces,
   wherein the anchor is substantially planar, extends away from the visible area and the ledge, and
   wherein the window insert is configured with two or more creases that form an angle when the ledge is in an extended position.

19. The device of claim 18 wherein the creases and the angle are each positioned on a continuous piece of card stock between the ledge of the window insert and the visible area of the window insert.

20. A device for insertion into a gap near a window, the device comprising:
a window insert comprising an anchor, a visible area, and a ledge,
wherein the window insert is formed from a polymer card stock material or a paper card stock material,
wherein the visible area has one or more areas for receiving printed images or text or both on a visible surface of the window insert,
wherein the ledge is extendable away from the visible area and the ledge comprises a plurality of surfaces including a bottom surface, the plurality of surface substantially defining a void space within the ledge,
wherein one or more wells is positioned within or extends into the void space from one or more surfaces of the plurality of surfaces,
wherein the anchor is substantially planar, extends away from the visible area and the ledge, and the anchor has a bottom end,
wherein the bottom end of the anchor extends from the ledge,
wherein the bottom end of the anchor extends below and beyond the bottom surface of the ledge,
wherein the ledge connects to the visible area of the window insert through one or more creases, and
wherein the creases are made along a width of the ledge and wherein the ledge and the visible area are made from the polymer card stock material or the paper card stock material.

21. The device of claim 20 wherein a section taken along the length of the window insert has a profile forming substantially a "P" shape.

22. The device of claim 20 wherein the ledge is expandable from a first retracted position to a second extended position, the second extended position providing access to one or more wells accessible through a top surface of the ledge.

23. The device of claim 22 wherein the wells are sized and shaped to accept a first vessel, the first vessel packaged and configured to retain and store foodstuffs.

24. The device of claim 23 further comprising a first vessel, the first vessel comprising a polymer shell and a removable sealing surface.

25. The device of claim 20 wherein the bottom surface of the ledge is attached to the anchor, or the visible area, or both.

26. The device of claim 20 wherein the ledge further defines one or more wells that extend downward into the void space of the ledge, at least when the ledge is in an extended position.

27. The device of claim 20 wherein the ledge is movable from a first position to a second extended position, the ledge in the first position is positioned atop the anchor, the ledge in the second position occupies a larger volume than when in the first position and also extends away from the anchor when in the second position.

28. The device of claim 20 wherein the ledge, the anchor, and the visible area are formed from a single paper card stock, the paper card stock having an area no greater than two square feet.

29. The device of claim 20 wherein the ledge, the anchor, and the visible area are formed from a single polymer card stock, the polymer card stock having an area no greater than two square feet.

30. The device of claim 20 wherein a means for securing the ledge to the window insert is used to secure a surface of the ledge to a portion of the window insert.

31. The device of claim 20 wherein the window insert is configured with two or more creases that form an angle when the ledge is in an extended position.

32. The device of claim 20 wherein the creases and the angle are each positioned on a continuous piece of card stock between the ledge of the window insert and the visible area of the window insert.

33. The device of claim 20 wherein the polymer card stock material or the paper card stock material is a continuous piece of card stock material.

\* \* \* \* \*